United States Patent Office 3,103,531
Patented Sept. 10, 1963

3,103,531
PREPARATION OF TRIALKANOLAMINE BORATES
Robert S. Braman, Mars, Pa., assignor to Callery Chemical Company, Pittsburgh, Pa., a corporation of Pennsylvania
No Drawing. Filed June 22, 1959, Ser. No. 821,620
8 Claims. (Cl. 260—462)

This invention relates to a new and improved method of preparing trialkanolamine borates and more particularly to their preparation from a trialkanolamine and a trialkyl borate.

The trialkanolamines have found particular use in industry as a curing or hardening agent for epoxy resins. Heretofore triethanolamine borates have been prepared by reaction of boric acid and triethanolamine. These esterification reactions have proved difficult and complex to perform on an industrial scale due to difficulty in removing the water formed by the reaction. Recently Elbling and Langer U.S. 2,785,192 have disclosed an improved method of accomplishing the esterification, but the method involves the use of multicomponent solvent systems, thereby complicating the process in the recovery of the trialkanolamine borate product and the recycle and reuse of the solvents.

It is an object of this invention to provide a simple direct method of preparing trialkanolamine borates. A further object is to provide a method of preparing trialkanolamine borates by reaction of a trialkyl borate and the trialkanolamine. Other objects will become apparent from the following specification and claims.

This invention is based on my discovery that a trialkanolamine and a trialkyl borate will readily react with or without a solvent to form a trialkanolamine borate according to the equation $$B(OR')_3 + N(ROH)_3 \rightarrow B(OR)_3N + 3R'OH$$

where R is a lower alkylene radical and R' is a lower alkyl radical.

The following example is illustrative of the invention and shows the directness and simplicity of this method of preparing triethanolamine borates. 88.5 mmols of trimethyl borate and 15.1 mmols of triethanolamine were placed in a reaction flask protected from atmospheric moisture contamination by a drying tube and agitated at room temperature. A pure white crystalline precipitate formed almost immediately, and was filtered from the reaction mixture. The precipitate was vacuum dried at room temperature, and was essentially pure crystalline triethanolamine borate.

In another example triisopropanolamine and excess trimethyl borate were mixed and warmed to dissolution of the amine. The excess trimethyl borate and produced methanol were removed from the reaction mixture by vacuum evaporation leaving the liquid residue of triisopropanolamine borate. When using the higher alkanolamines, which are solids at room temperature, it is preferable to warm the reaction mixture to obtain a homogeneous reaction.

Trimethyl borate is a preferred reactant as it is commercially available at a low cost. It is presently available in its most economic form as a trimethyl borate-methanol azeotrope. We have found that the reaction to produce trialkanolamine can be performed equally as well using the azeotrope or other methyl borate-methanol mixtures as well as pure methyl borate. The trialkanolamine product is soluble in mixtures containing a high proportion of methanol, and may be recovered from solution by conventional methods such as evaporation, crystallization, or salting out. Thus for example 132 mmols of trimethyl borate-methanol azeotrope (approximately equimolar composition) and 15.1 mmols of triethanolamine were contacted in a reaction flask and agitated for several minutes at room temperature. The resultant solution was evaporated under vacuum at room temperature to remove excess trimethyl borate and methanol, leaving a crystalline residue of pure triethanolamine borate.

The higher trialkanolamine borates are quite soluble in reaction mixtures containing excess trimethyl borate, in contrast to the triethanolamine borate. They may be separated by any of the conventional methods. A particularly convenient method is to treat the reaction mixture with a hydrocarbon, e.g., pentane or hexane, whereby a phase separation occurs. The hydrocarbon phase contains the excess trialkyl borate and produced alcohol; the other phase is the trialkanolamine borate. For example, 30.4 mmols of triisopropanol amine borate and 26.5 mmols of trimethyl borate were heated to dissolution of the amine. The mixture was allowed to cool to room temperature and 70 ml. of hexane was added, forming two liquid layers. The upper hydrocarbon layer was decanted, and the procedure was repeated using 70 more ml. of hexane. The heavier layer was vacuum dried to remove the last traces of trimethyl borate and methanol, and was found to be substantally pure triisopropanolamine borate.

The reaction proceeds equally as well when any other inert solvent or liquid reaction medium is used, for example ethanol or higher alcohols, or hydrocarbons such as petroleum ether, kerosenes or xylene.

The reaction may be carried out satisfactorily with any proportion of reactants. When preparing triethanolamine borate using trimethyl borate with no alcohol or other solvent, it is preferred to use a substantial excess of the trimethylborate. Since the triethanolamine borate is insoluble in trimethylborate, and only slightly soluble in mixtures containing trimethylborate and minor parts of methanol, e.g., that produced by the reaction, the reaction product can be recovered simply and directly by filtration.

According to the provisions of the patent statutes, I have explained the principle and mode of practicing my invention, I have described what I now consider to be its best embodiments. However, I desire to have it understood that within the scope of the appended claims, the invention may be practiced otherwise than as specifically described:

I claim:
1. A method of preparing a lower trialkanolamine borate that comprises the steps of reacting a lower trialkanolamine with a lower trialkyl borate and recovering the trialkanolamine borate formed thereby.
2. A method according to claim 1 in which the trialkanolamine is triethanolamine.
3. A method according to claim 1 in which the trialkyl borate is trimethyl borate.
4. A method according to claim 3 in which the trimethyl borate is in substantial stoichiometric excess.
5. A method according to claim 3 in which the trimethyl borate is admixed with methanol.
6. A method of preparing triethanolamine borate which comprises the steps of reacting triethanolamine with a substantial excess of trimethyl borate, and separating and drying the precipitated triethanolamine borate.
7. A method of preparing triethanolamine borate which comprises the steps of reacting triethanolamine and tri- methyl borate-methanol azeotrope, evaporating trimethyl borate and methanol from the reaction mixture, and recovering the solid triethanolamine borate.

8. A method of preparing triisopropanolamine borate which comprises the steps of reacting triisopropanolamine with a substantial excess of trimethyl borate, contacting the reaction mixture with a hydrocarbon to effect a phase separation, and recovering the triisopropanolamine borate phase.

References Cited in the file of this patent

UNITED STATES PATENTS

| | | |
|---|---|---|
| 2,441,063 | Gilmann | May 4, 1948 |
| 2,587,753 | O'Connor et al. | Mar. 4, 1952 |
| 2,785,192 | Elbling et al. | Mar. 12, 1957 |
| 2,839,564 | Garner | June 17, 1958 |
| 2,894,020 | McManimie | July 7, 1959 |
| 2,942,021 | Groszos et al. | June 21, 1960 |